(12) United States Patent
Köppel et al.

(10) Patent No.: US 9,074,925 B2
(45) Date of Patent: Jul. 7, 2015

(54) METHOD FOR THE TEMPERATURE-CORRECTION OF A FORCE-MEASURING DEVICE, AND FORCE-MEASURING DEVICE

(75) Inventors: Thomas Köppel, Oetwil am See (CH); Daniel Reber, Madetswil (CH)

(73) Assignee: METTLER-TOLEDO AG, Greifensee (CH)

( * ) Notice: Subject to any disclaimer, the term of this patent is extended or adjusted under 35 U.S.C. 154(b) by 837 days.

(21) Appl. No.: 13/355,980

(22) Filed: Jan. 23, 2012

(65) Prior Publication Data

US 2012/0173168 A1 Jul. 5, 2012

Related U.S. Application Data

(63) Continuation of application No. PCT/EP2010/060758, filed on Jul. 23, 2010.

(30) Foreign Application Priority Data

Jul. 23, 2009 (EP) .................................... 09166245

(51) Int. Cl.
*G01G 3/18* (2006.01)
*G01G 23/01* (2006.01)
(Continued)

(52) U.S. Cl.
CPC ............... *G01G 23/01* (2013.01); *G01G 23/48* (2013.01); *G06F 19/00* (2013.01); *G06F 17/40* (2013.01); *G01G 3/18* (2013.01); *G01G 7/04* (2013.01)

(58) Field of Classification Search
CPC ........... G01D 7/00; G01D 9/00; G01D 21/00; G01G 3/00; G01G 3/18; G01G 7/00; G01G 7/04; G01G 23/00; G01G 23/01; G01G 23/48; G01L 1/00; G01L 1/16; G06F 11/00; G06F 11/32; G06F 11/34; G06F 15/00; G06F 15/16; G06F 17/00; G06F 17/10; G06F 17/40; G06F 19/00

USPC ................. 73/1.01, 1.08, 1.15, 432.1, 865.8, 73/865.9, 866.3; 177/1, 25.11, 264; 340/500, 501, 540, 584, 665, 666; 374/100, 120, 141, 142, 152; 702/1, 702/33, 41, 42, 44, 85, 101, 104, 127, 173, 702/187, 189; 708/100, 105, 200
See application file for complete search history.

(56) References Cited

U.S. PATENT DOCUMENTS 3,618,685 A * 11/1971 Fiet .......................... 177/21 OR
3,967,188 A * 6/1976 Spencer ....................... 323/367
(Continued)

FOREIGN PATENT DOCUMENTS

CH 658516 A5 11/1986
CH 669041 A5 2/1989
(Continued)

OTHER PUBLICATIONS

International Search Report (PCT/ISA/210) issued on Sep. 1, 2010, by European Patent Office as the International Searching Authority for International Application No. PCT/EP2010/060758.
(Continued)

*Primary Examiner* — Edward Cosimano
(74) *Attorney, Agent, or Firm* — Buchanan Ingersoll & Rooney PC

(57) ABSTRACT

An exemplary method for the temperature correction of a force-measuring device such as a balance is disclosed. The method includes generating, by means of a force-measuring cell, a force measurement signal corresponding to the input force; generating an electrical temperature measurement signal by means of a temperature sensor that is arranged at a distance from the heat-generating components of the force-measuring device, processing the force measurement signal into a temperature-corrected output signal based on the temperature measurement signal and the force measurement signal; and transmitting the output signal to an indicator unit and/or to a further processing unit.

19 Claims, 4 Drawing Sheets

(51) Int. Cl.
  *G01G 23/48* (2006.01)
  *G06F 17/40* (2006.01)
  *G06F 19/00* (2011.01)
  *G01G 7/04* (2006.01)

(56) References Cited

U.S. PATENT DOCUMENTS

| | | | |
|---|---|---|---|
| 4,489,800 | A | 12/1984 | Nufer et al. |
| 4,656,599 | A | 4/1987 | Knothe et al. |
| 4,730,683 | A | 3/1988 | Reichmuth |
| 4,858,145 | A | 8/1989 | Inoue et al. |
| 7,361,867 | B2 | 4/2008 | Von Steuben et al. |
| 7,478,001 | B2 * | 1/2009 | Fasig et al. ............ 702/101 |
| 7,479,116 | B2 | 1/2009 | Yarden et al. |
| 2006/0216004 | A1 | 9/2006 | Von Steuben et al. |
| 2008/0262774 | A1 * | 10/2008 | Fasig et al. ............ 702/101 |

FOREIGN PATENT DOCUMENTS

| | | |
|---|---|---|
| CN | 87 1 02892 A | 12/1987 |
| CN | 101247756 A | 8/2008 |
| DE | 29803425 U1 | 6/1998 |
| DE | 10353414 B3 | 1/2005 |
| GB | 1495278 | 12/1977 |
| GB | 2098774 A * | 11/1982 |
| GB | 2149512 A | 6/1985 |
| JP | S59-37426 A | 2/1984 |
| JP | 2001-99699 A | 4/2001 |
| JP | 2004-309251 A | 11/2004 |

OTHER PUBLICATIONS

European Search Report issued on Feb. 5, 2010, by European Patent Office for European Application No. 09166245.

Zhao et al., "Two Factors for Influencing Weighing Accuracy of Electronic Balance" Metering Technology, (Feb. 28, 2005), pp. 55-56.

Office Action dated Mar. 28, 2013, issued in corresponding Chinese Patent Application No. 201080033262.8, and a partial English Translation of the Office Action. (15 pages)

Notification of Transmittal of Translation of the International Preliminary Report on Patentability (Forms PCT/IB/338 and PCT/IB/373) and the Written Opinion of the International Searching Authority (Form PCT/ISA/237) issued on Feb. 16, 2012, in corresponding International Application No. PCT/EP2010/060758. (11 pages).

Japanese Office Action issued on Mar. 4, 2014, by the Japanese Patent Office in corresponding Japanese Patent Application No. 2012-521057. (3 pages).

* cited by examiner

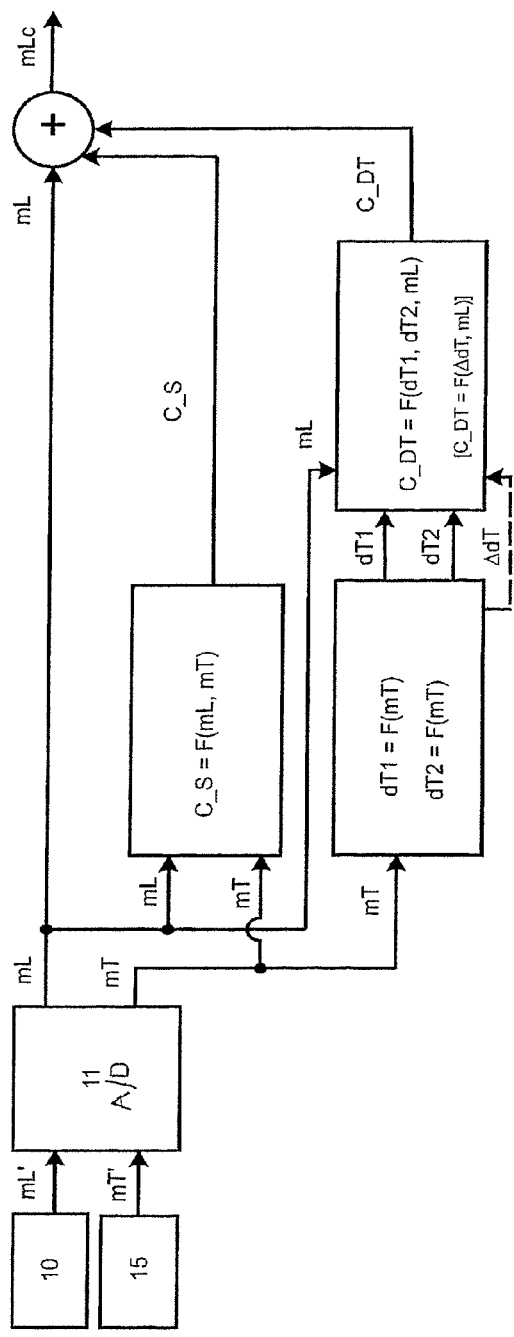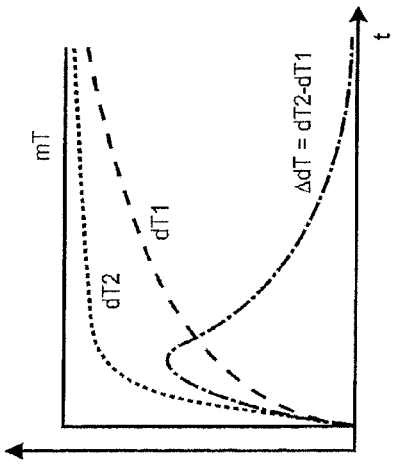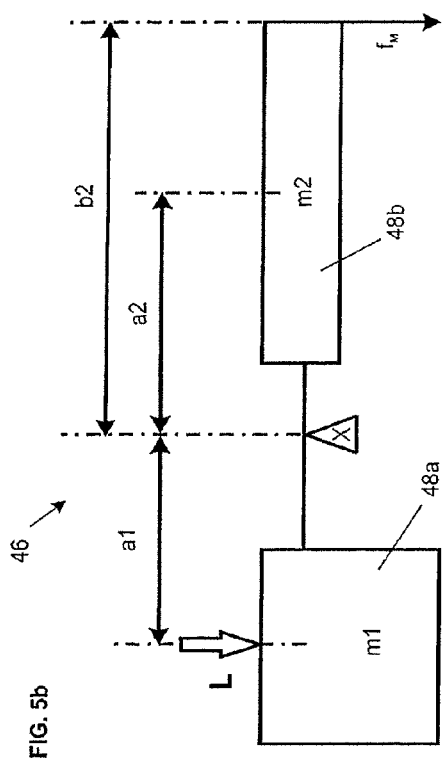
FIG. 5a
FIG. 5b
FIG. 5c

METHOD FOR THE TEMPERATURE-CORRECTION OF A FORCE-MEASURING DEVICE, AND FORCE-MEASURING DEVICE

RELATED APPLICATIONS

This application claims priority as a continuation application under 35 U.S.C. §120 to PCT/EP2010/060758, which was filed as an International Application on Jul. 23, 2010 designating the U.S., and which claims priority to European Application 09166245.2 filed in Europe on Jul. 23, 2009. The entire contents of these applications are hereby incorporated by reference in their entireties.

FIELD

The present disclosure relates to a force-measuring device, such as a method for the correction of temperature-related errors in a force-measuring device.

BACKGROUND

Known force-measuring devices include different functional parts such as a force-receiver, a force-transmitting mechanism, a force-measuring cell, and in some cases a device for the processing of measurement signals. A force that is to be measured is received by the force-receiver and transmitted by way of the force-transmitting mechanism to the force-measuring cell. The force-measuring cell converts the incoming force into an electrical force measurement signal which corresponds to the force acting on the force-measuring device.

Analogously, in the case of a balance the input force is represented by the weight force of the weighing object, the so-called weighing load acting on the force-receiver which has the form of a weighing pan. This force input is transmitted by the force-transmitting mechanism in the form of a linkage to the force-measuring cell or weighing cell where it is converted into an electrical force measurement signal, such as weighing signal.

The electrical force measurement signal is transmitted to a signal-processing unit which serves to further process the force measurement signal and to generate a corresponding output signal. The output signal is transmitted to an indicator unit and/or to a further processing device, for example a master computer or a system controller.

Force-measuring devices or balances of this kind can be used to weigh individual weighing objects, but they also find application in automated production- and test systems for the weighing of larger quantities of weighing goods. A force-measuring device of this type has to meet high levels of accuracy, reproducibility and stability of the measurements. In addition, the force-measuring device should be, as far as possible, of a simple and cost-effective design.

Known practices that influence factors causing errors in the weighing result have to be measured and appropriately corrected to obtain accurate and stable measurements. For example, a method is described in GB 1495278 for correcting the influence of load-independent parameters, in particular the influence of a temperature which affects the weighing device from the outside. The correction is accomplished by measuring the ambient temperature to which the weighing device is exposed and by generating a corresponding electrical temperature measurement signal. Based on the temperature measurement signal, the force measurement signal is then processed into a temperature-corrected output signal. Using this method, it is also possible to correct time-dependent phenomena, for example the creep effect following an elastic deformation, by means of a time-dependent exponential function.

This known correction method is based on the assumption that the force-measuring device is in a condition where all of its components share the same temperature, for example the temperature of the ambient environment. However, situations often occur in which the different components of the force-measuring device have unequal temperatures. For example, it is possible that additional heat is generated in a force-measuring device during operation, which raises the temperature in some components of the force-measuring device. Consequently, there will be a temperature difference between the operation related temperatures of the components and the ambient temperature to which the device is exposed.

In general, temperature differences of this kind will affect the measurements of the force-measuring device, for example the measurements of the input force or input load acting on the device. The aim is therefore to correct the influence of these temperature effects as completely as possible, particularly in force-measuring devices that have to meet high standards of accuracy and stability.

Known devices offer different solutions for correcting the effects of temperature differences. For example, a balance disclosed in DE 10353414 B3 has at least two temperature sensors which are arranged at different locations, wherein an initial correction value is selected dependent on the difference between the output signals of the two temperature sensors immediately after the power supply is turned on. The two temperature sensors, more specifically the temperature difference measured by them, serve to indirectly determine the length of time during which the device was switched off before being switched back on. Through mathematical computing means, the weight-dependent signal generated by the weighing system is corrected dependent on the length of time elapsed since the device was switched on. This allows a drastic reduction in time from switching on the power supply until the balance reaches its full accuracy. Thus, this proposed solution is directed at the power-up behavior of the balance.

An electronic balance disclosed in GB 2149512A has two measurement sensors which measure factors having a detrimental influence on the weighing result. One of the measurement sensors is for example a temperature sensor which is fastened to the force compensation coil in order to measure the temperature change caused by power dissipation in the compensation coil and to correct the output signal of the measurement transducer of the balance based on the measured temperature change. The data of the temperature sensor are continuously entered into a storage memory of the digital signal-processing unit and stored for a specified length of time. Data originating from different points in time are assigned different weights according to the inertia of the measurement sensor, if they are used for the correction of the output signal of the measurement transducer of the balance. The correction performed is thus of a phenomenological nature.

A balance which is disclosed in DE 29803425 U1 includes a device for the temperature compensation of the zero point signal, wherein in a first step the rate of change dT/dt of the temperature is determined and, if the latter is found to be small enough, the current zero point signal is stored together with the current temperature signal, and wherein, after a sufficiently large number of value pairs have been collected, they serve as the basis for calculating the temperature coefficient of the zero point, which is then used to correct the zero point, for example the zero-load value, of the weighing result.

In a balance described in CH 658516 which is based on the principle of electromagnetic force compensation, the compensating force is generated by means of a current flowing through a coil that is arranged in the air gap of a permanent magnet. As a result of the current, the temperature of the coil is higher than in those components which are arranged farther removed from the coil and whose temperature is determined essentially by the ambient room temperature to which the device is exposed. To compensate for this temperature difference, a temperature sensor is arranged in the interior of the permanent magnet assembly to measure a temperature that corresponds to the increased temperature of the permanent magnet. Based on the measured temperature, the force-measurement signal is then corrected. However, due to the thermal inertia of the permanent magnet, the temperature sensor can respond only slowly to the changes of the ambient temperature. Thus, regardless of the compensation, detrimental influences remain which can introduce errors in the weighing result. Also, the installation, adjustment and inspection of the temperature sensor in the permanent magnet are costly and error-prone. These are the drawbacks of an arrangement where the temperature sensor is located next to or inside a critical component that is directly associated with the actual force measurement.

For a more direct measurement of the heat generation, a concept is proposed in CH 669041 where the temperature sensor is arranged within the windings of the coil. This allows the temperature to be measured at the center of the heat source, for example in the coil windings. Nevertheless, the installation and adjustment of the temperature sensor is still fraught with problems. Furthermore, the measurement value is possibly not representative for the correction of the temperature dependence of the magnetic field, as the latter depends primarily on the temperature of the permanent magnet and only secondarily on the temperature of the coil.

Exemplary embodiments of the present disclosure are directed to an improved method for the temperature correction in a force-measuring device, specifically in a balance, with the aim of achieving a simple and cost-effective operation while simultaneously meeting high standards in regard to measurement accuracy and stability. In particular, the effort is directed at providing a method for the compensation of a temperature difference, where the temperature sensor can be installed, adjusted and inspected in a simple manner. Other exemplary embodiments are also directed to a suitable force-measuring device of a simple, cost-effective and reliable design.

The following observations principally concern the normal operation of a balance. Power-up episodes and malfunctions are not taken into account.

An exemplary embodiment of the present disclosure include a method for the temperature correction of a force-measuring device, specifically a balance, during its normal operation, with the steps: by means of a force-measuring cell, generating a force measurement signal corresponding to the input force; measuring a temperature by means of a temperature sensor that is arranged at a distance from the heat-generating components of the force-measuring device, wherein said temperature corresponds primarily to an ambient temperature to which the force-measuring device is exposed, and generating a temperature signal corresponding to the measured temperature; processing the force measurement signal into a temperature-corrected output signal based on the temperature measurement signal and the force measurement signal; and transmitting the output signal to an indicator unit and/or to a further processing unit. In the processing step, at least one correction parameter serving for the correction of the output signal is calculated from the force measurement signal and the temperature measurement signal by means of an underlying thermodynamic model, wherein the correction parameter represents a temperature difference which exists between a system temperature and the measured temperature and/or between a first system temperature and a second system temperature.

Exemplary methods disclosed herein include a simple, efficient and precise temperature compensation can be performed without the need for a costly and/or error-prone installation of a temperature sensor next to or inside of critical components of the force-measuring device. This method can also eliminate the need to install further temperature sensors at different locations of the force-measuring device. Accordingly, a simple and cost-effective design of the force-measuring device can be achieved. In addition, advantages are gained in regard to costs, reliability and stability of the force-measuring device, as the calculations can be performed through simple means in retraceable steps.

Thus, compared against known devices, exemplary embodiments disclosed herein provide an additional thermal influence factor which significantly affects the force-measurements that is calculated by way of a thermodynamic or physical model. This calculated influence factor is then used for an additional correction of the force measurement signal.

The temperature sensor is arranged at a location of the force-measuring device where the temperature measured by the sensor corresponds primarily to the ambient temperature. Temperatures occurring at or near heat-generating components can be calculated by means of the thermodynamic or physical model. The term "ambient temperature" as used in the present disclosure includes different temperatures of the environment to which the force-measuring device is exposed. For example, the temperature of the atmosphere surrounding the force-measuring device or existing in the space inside a housing of the force-measuring device, as well as the temperature of the surface or table on which the device is standing, or the temperature of the object being measured.

The ambient temperature is always acting on the force-measuring device and on a temperature sensor that is arranged at or inside the force-measuring device. However, the measured temperature in some places can deviate from the ambient temperature, for example if additional temperature factors connected to the operation of the force-measuring device enter into the situation.

The term "system temperature" as used herein refers to a temperature that can be assigned to a system component of the force-measuring device. For example, the temperature of a component or part of a component or of a group of components such as the coil, the permanent magnet, the core of the permanent magnet, the air gap, a lever, the position sensor or its mounting attachment, as well as the force receiver, the force-transmitting mechanism, or the force-measuring cell.

In accordance with an exemplary embodiment, the temperature sensor is arranged so that the measured temperature, and thus the electrical temperature measurement signal, corresponds primarily to the ambient temperature. For example, the sensor can be in direct thermal contact either with the ambient atmosphere or with those components whose system temperature is determined primarily by the ambient temperature. Less suitable is an arrangement where the temperature sensor is close to components whose temperature is determined essentially by operation-related factors of the force-measuring device. Thus, the temperature sensor can be arranged on or near thermally passive or stationary components of the force-measuring cell. However, it can also be placed next to components that are exposed to the environment or located on the outside of the force-measuring device, such as the housing, or it can be attached to movable parts such as the force receiver or the force-transmitting mechanism. Furthermore, the temperature sensor could also be arranged outside of the housing or in the vicinity of the force-measuring device.

This exemplary arrangement has the advantageous result that the temperature sensor can react directly and rapidly to changes of the ambient temperature. The measurement of the ambient temperature is further to a large extent independent of the force measurement and thus disconnected from the influence of the latter, for example from heat generation associated with it. It is of particular advantage that the temperature sensor can be arranged at almost any non-critical locations or components of the force-measuring device, so that the installation, adjustment and/or inspection of the temperature sensor can be performed without a problem.

In principle, the method according to the invention can be used for any corrections of temperature differences in force-measuring devices. Thus, it is possible to correct a temperature difference resulting from heat that is generated, for example, in a sudden surge. On the other hand, it is also possible to correct temperature differences resulting generally from the difference between the ambient temperature and a system temperature or between two system temperatures. The correction parameter CP can thus represent different temperature differences.

Situations with different system temperatures can occur if the ambient temperature acting on the force-measuring device changes at a relatively rapid rate and the system temperatures, because of the thermal inertia of the components, cannot follow the changes, or at least not immediately. The resultant temperature difference thus comes from a change that occurs over a short time interval or instantaneously and therefore manifests itself only during a certain length of time, while the system temperature of a component occurs with a time delay after the jump of the ambient temperature. However, these temperature differences smooth themselves out over time, until a new equilibrium level has been reached in accordance with a certain speed of response.

The speed of response, and thus the development of a time-dependent temperature difference, depends on the thermal characteristics of the components themselves and/or their ties to other components and/or to the ambient environment. These thermal characteristics can be connected to a diversity of thermodynamic factors, for example to the thermal inertia, the heat influx, heat conduction, and outflow of heat, as well as to the mass or the surface of the components, and also to their thermal expansion.

It is of particular advantage that the correction according to the invention is not restricted with regard to the locations in the force-measuring device where it can be used, as the system temperature can be calculated for any location and/or component of the force-measuring device. Accordingly, there are no locally restricted measurement areas as would be the case with temperature sensors whose measurement values may not be representative for the component being measured.

The system temperature can be determined without additional cost for different locations and/or components without the need to install a multitude of sensors. Thus it is also possible to determine very complex forms of temperature distributions in the force-measuring device in a cost-effective manner and use them for the correction. In particular, based on a single temperature measurement made at a non-problematic location it is possible to calculate the temperature difference between two different components of the force-transmitting mechanism as well as the influence that this temperature difference will have on the determination of the force measurement signal.

This further eliminates all error-causing thermal influences that are associated with thermal effects in the mounting attachment of the temperature sensor. For example, adhesive bonding of the temperature sensor to a component normally produces a heat-insulating boundary layer which often leads to errors and/or time lags in the system temperature being measured. Problems of this kind will not occur if the system temperature is determined through a calculation.

Further, by refining the calculations in accordance with the specified levels of accuracy, it is possible to calculate complex and diverse thermal influence factors and apply them to the correction of the force measurement signal.

The term "signal-processing unit" in the present context covers all signal-processing elements that are suitable for the processing of the measurement signals of the force-measuring cell and the temperature sensor, for example analog or digital circuits, integrated circuits, shift registers, processors, computers and the like.

In a first advantageous embodiment of the invention, the correction parameter is calculated by means of a response function and a convolution integral. Thermodynamic phenomena that lead to corresponding temperature differences can thereby be calculated in a compact form and applied to the correction. The correction parameter can be calculated by convoluting the temperature measurement signal with the time derivative of the response function, the force measurement signal or a dissipation power function determined from the force measurement signal. This allows the measured signal, including in particular its profile over a preceding length of time, to be taken into account in the calculation of the correction parameter. The individual steps of this calculation are presented hereinafter in the detailed description of exemplary embodiments.

In principle there are a multitude of time-dependent functions that can be used as response functions, for example exponential functions or polynomials. The response function can be defined in accordance with at least one systematic concept of thermodynamics and/or as a thermodynamic response to an input in the form of a step function or impulse function and/or as a time decay function, in particular an exponential function with a given time constant. A diversity of thermodynamic phenomena such as heat conduction, thermal expansion, or the weakening of a magnetic field with increasing temperature can be represented through a model and used for the calculation of the correction parameter. The calculation can furthermore be adapted to the given conditions of a practical situation, for example by adapting the time constants to the thermal conductivities of the different materials.

In an exemplary embodiment of the present disclosure, the correction parameter is calculated by a recursive method. This makes it possible to calculate the values of complicated formulas, in particular the convolution integral, by means of simple mathematical operations, for example by elementary multiplications, summations and time delay functions. In addition, the storing in memory of numerical values and intermediate results can be strongly reduced. As a further benefit, this recursive method provides largely delay-free, for example real-time signal processing.

The correction parameter can be calculated as a time-dependent quantity which depends on the time profile, in particular the rate of change, of the measured temperature and/or the force-measurement signal. This correction primarily takes care of temperature differences that manifest themselves in a short-term or transient manner. Consequently, a so-called dynamic temperature correction can be made, whereby a high level of measurement accuracy can be achieved even for short-term temperature changes.

Of particular advantage is the possibility that the time dependence can by taken directly into account in the calculation. This delay-free correction of temperature differences is advantageous in comparison to temperature measurements, in which one has to expect errors that are caused by the temperature sensor itself, due to its thermal characteristics, in particular its thermal inertia.

In a further embodiment, the system temperature corresponds to a temperature of a component of the force-measuring device, in particular a force input device, a force-transmitting mechanism, a lever or lever arm, and the output signal is corrected dependent on the thermal expansion of the component. As a result, a temperature difference which, through changes in the component dimensions, injects an error into the force measurement can be effectively corrected.

In principle, a temperature change causes a dimensional change of all components affected. However, normally the dimensions of the affected components will not change at the same speed, as the rate of change depends on the individual characteristics of each respective component. As a result, a change in the force-transmitting behavior, specifically a shift of equilibrium, will occur in these components or parts thereof. This has the effect of introducing an error into the force measurement which, however, can be effectively corrected with exemplary methods disclosed herein.

The particular component can be a lever or lever arm that serves to transmit the applied force to the force-measuring cell. Thus, the correction parameter corresponds to a lengthwise dimension of the lever or the lever arms. Consequently, the effects related to the ambient temperature can be calculated with a simple thermodynamic model, as will be shown in the detailed description.

In another exemplary embodiment, the correction parameter represents at least two of the temperature differences associated, respectively, with different components of the force-measuring device, in particular two opposite arms of a lever. Temperature differences of this kind occur when different components whose thermal characteristics are not matched to each other respond to a short-term or instantaneous change of the ambient temperature. In this case, exemplary methods of the disclosure is especially advantageous as it does not specify a major processing effort involving a plurality of temperature measurement signals and a correspondingly difficult adjustment. In addition, it can eliminate the installation of several temperature sensors, which contributes to a cost-effective design.

It is of particular advantage that exemplary methods disclosed herein can also be used in complex setups with a multitude of different components. With the inventive concept of the correction parameter, a larger number of temperature differences can be represented and used for the correction.

The correction parameter can in particular contain a group of two values which includes a first temperature difference of a first lever arm and a second temperature difference of a second lever arm. This makes it possible to calculate the complex behavior of several time-dependent processes that are superimposed on each other, in this case the different time-dependent behaviors of the two lever arms.

In another exemplary embodiment disclosed herein, the correction parameter is calculated by means of a differential signal representing the difference between two temperature differences. This calculation eliminates the dependence on a further reference temperature, in particular the ambient temperature acting on the force-measuring device, and the temperature differences can be calculated as a single signal, for example the difference signal. This simplifies the handling of the correction parameter, it particular its transfer into further calculations.

In yet another exemplary embodiment according of the present disclosure, the force-measuring device is based on the principle of electromagnetic force-compensation, and the quantity being represented by the correction parameter is a temperature difference that is connected to the process of generating the compensation force. Using this principle, the force-measuring cell generates a compensation force which balances the input force acting on the force-measuring device. Thus, the force-measuring cell always maintains the same position even when the applied weight changes, so that the phenomenon of creep as is associated with known devices, for example the problem of deformation and/or material fatigue, will be entirely absent or manifest itself only to a very minor extent.

The amount of heat released in the process of generating the compensation force generally causes a temperature increase in those components that serve to generate the compensation force. By using exemplary temperature correction methods disclosed herein, correcting this influence now becomes a remarkably simple matter, in that the temperatures or their effects at the critical locations of heat generation are determined by calculation. Consequently, one no longer has to contend with the effort and expense of installation, adjustment and monitoring of temperature sensors on these components, which is particularly advantageous in view of the fact that the access to these components is normally difficult.

In accordance with another exemplary embodiment, the compensation force is generated by means of a coil through which a current is flowing, whereby power is dissipated into heat. The correction parameter is calculated depending on the force-measurement signal, in particular as a function of the power dissipation which can be derived from the force-measurement signal. This power dissipation generates a temperature change in the coil and in the components surrounding the coil. The temperature change, in turn, causes a force effect that changes with time in the form of a so-called load drift. This load drift can now be corrected in a simple and precise manner according to an exemplary method disclosed herein, in that the correction parameter is determined in direct dependence on the heat source, for example the power dissipation taking place in the coil.

This exemplary method is of particular advantage under time-dependent conditions, when the current flowing through the coil is variable with time and its magnitude therefore depends on the force which is acting at the moment. Accordingly, with variations of the current, different amounts of power are dissipated, resulting in different temperatures and thus time variations of the forces acting in the system. With the calculation, these variable conditions can be compensated instantly and in a flexible way.

In a further exemplary embodiment of the present disclosure, the compensation force is generated by the interaction of a coil and a permanent magnet, in which case the system temperature corresponds to a temperature of the coil and/or of the permanent magnet. As both the coil and the permanent magnet participate in the generation of the force, these components are particularly critical in regard to intrusive steps taken to measure the system temperatures.

Since the coil is normally arranged in the air gap of the permanent magnet, a temperature change in the coil will cause a corresponding change of the permanent magnet due to the heat transfer by way of different components of the force-measuring device or through the air in the air gap. A temperature change of the permanent magnet, in turn, affects the magnetic field of the latter and thus also has an effect on the compensation force being generated. Consequently, a constant input load on the force-measuring device leads to a gradual rise in temperature and thus creates the appearance of a time-dependent change of the input load, for example the phenomenon of load drift.

In the process of calculating the system temperature, this heat transfer which takes place between the coil where the temperature changes originate and the magnet where they produce their effect can be calculated with good approximation and thus used for the temperature correction.

In a further exemplary embodiment, at least two corrections of the force measurement signal are calculated, respectively, through at least two different, substantially separate arithmetic modules, wherein in each module at least one of the aforementioned correction parameters is calculated. With this modular concept, the calculation can be set up to deal with a large diversity of temperature effects and can be adapted in a simple way to meet changing specifications.

The exemplary embodiments disclosed herein further relates to a force-measuring device, in particular a balance, with a force-measuring cell generating an electrical force measurement signal representative of the applied force, with a temperature sensor arranged at a distance from the heat-generating components of the force-measuring device, wherein the temperature sensor measures a temperature corresponding primarily to an ambient temperature acting on the force-measuring device and generates a temperature measurement signal representing the measured temperature, and further with a signal-processing unit which is configured to process the force-measurement signal, based on the temperature measurement signal and the force measurement signal, into a temperature-corrected output signal which can be transmitted to an indicator unit and/or to a further processing unit. The signal-processing unit is suitably configured to calculate, by means of a thermodynamic model, a correction parameter serving for the correction of the output signal of the force-measuring device during its normal operation, wherein the correction parameter represents a temperature difference that exists between a system temperature and the measured temperature and/or between a first system temperature and a second system temperature.

In another exemplary embodiment of the force-measuring device, the temperature sensor is in thermal contact with a component, in particular a stationary component, of the force-measuring device, wherein the system temperature of the component is determined primarily by the ambient temperature acting on the force-measuring device. With this arrangement, the influence that the ambient temperature has on the components can be directly taken into account, whereby a precise compensation of these influence factors can be achieved. The temperature sensor can be arranged on the stationary components of the force-measuring cell, for example on the part where the force-measuring cell is fastened. Thus, the temperature sensor can be mounted in a simple manner on a non-critical part of the force-measuring device and the temperature measurement signal can be transmitted to its destination without affecting the force measurement.

Exemplary methods according to the present disclosure can be implemented in a software program which can be executed in a signal-processing unit and which serves to calculate the output signal in accordance with an exemplary embodiment. In this way, it is possible to achieve a high degree of flexibility and the capability to reuse the calculation algorithm in other applications.

SUMMARY

An exemplary method for the temperature correction of a force-measuring device operating in measurement mode is disclosed, comprising: generating, by means of a force-measuring cell, an electrical force measurement signal corresponding to the input force; measuring a temperature by means of a temperature sensor that is arranged at a distance from the heat-generating components of the force-measuring device, wherein said temperature corresponds primarily to an ambient temperature to which the force-measuring device is exposed, and generating a temperature measurement signal corresponding to the measured temperature; processing the force measurement signal and the temperature measurement signal to obtain a temperature-corrected output signal; and transmitting the output signal to an indicator unit and/or to a further processing unit, wherein processing the force measurement signal and the temperature measurement signal includes calculating at least one correction parameter serving for the correction of the output signal from the force measurement signal and the temperature measurement signal based on a thermodynamic model wherein said correction parameter represents a temperature difference which exists between at least one of: a) a system temperature and the measured temperature, and b) a first system temperature and a second system temperature.

An exemplary force-measuring device is disclosed comprising: heat generating components; a force-measuring cell generating an electrical force measurement signal corresponding to the applied force, and including: a temperature sensor arranged at a distance from the heat-generating components, wherein said temperature sensor measures a temperature that corresponds to an ambient temperature acting on the force-measuring device and generates a temperature measurement signal corresponding to the measured temperature, wherein the measured temperature corresponds to an ambient temperature acting on the force-measuring device; and a signal-processing unit that is configured to process the force measurement signal based on the temperature measurement signal and the force-measurement signal into a temperature-compensated output signal which can be transmitted to at least one of an indicator unit and a further processing unit, wherein the signal-processing unit is configured to calculate a correction parameter which is a correction of the output signal when the force-measuring device operates in measurement mode, wherein the correction parameter describes a temperature difference which exists between at least one of: a) a system temperature and the measured temperature, and b) a first system temperature and a second system temperature.

BRIEF DESCRIPTION OF THE DRAWINGS

Details of the exemplary methods and of the corresponding force-measuring device are presented in the description of the exemplary embodiments shown in the drawings, wherein

FIG. 5a illustrates a schematic diagram of a balance with a third signal-processing unit in accordance with an exemplary embodiment;

FIG. 5b is a schematic diagram of a force-measuring device in accordance with an exemplary embodiment;

FIG. 5c is a graph of temperature profiles in accordance with an exemplary embodiment.

DETAILED DESCRIPTION

Figure 1:
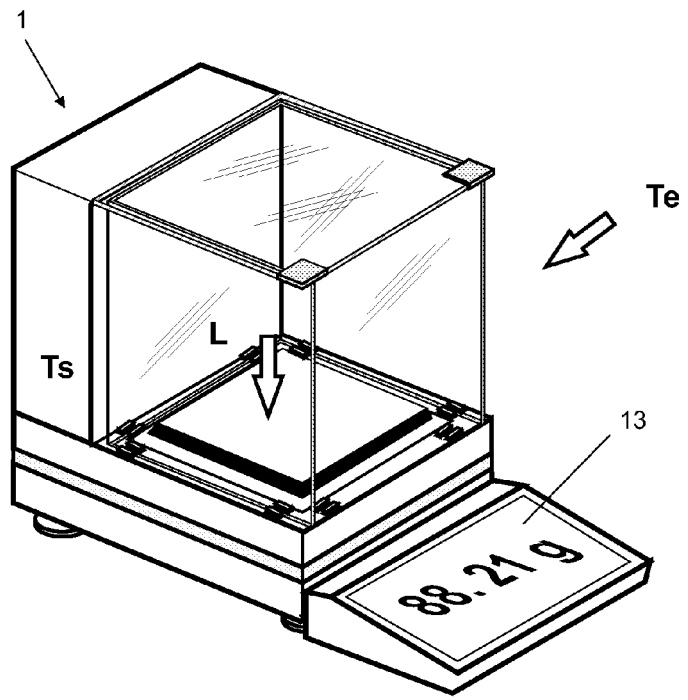
FIG. 1 illustrates a balance in accordance with an exemplary embodiment.

FIG. 1 illustrates a balance in accordance with an exemplary embodiment. A compensation force F is generated in response to a load L which acts in opposition to the input load L. Ambient temperature Te acts on the balance from the outside and has a significant influence on the accuracy and stability of the measurements. The measurement values determined by the balance can change as a function of the load L, and can also change based on the ambient temperature Te as well as in response to the effects of a system temperature Ts acting inside the force-measuring device.

The system temperature Ts can, for a variety of reasons, deviate from the ambient temperature Te. For example, in the process of generating the compensation force, power is dissipated in the interior space of the balance, which causes an increase in the system temperature Ts. However, temperature differences can also develop as a result of the thermal inertia of the components of the force-measuring device, if the temperature changes of the components cannot follow the source of the temperature changes fast enough. The signal-processing unit, which is part of the balance (e.g., force measuring device) 1, therefore has the task to separate the measurement values corresponding to the load L as much as possible from the these adverse temperature effects and to achieve as a result that the measurement values displayed on the indicator 13, for example a liquid crystal display, are accurate and stable.

Figure 2:
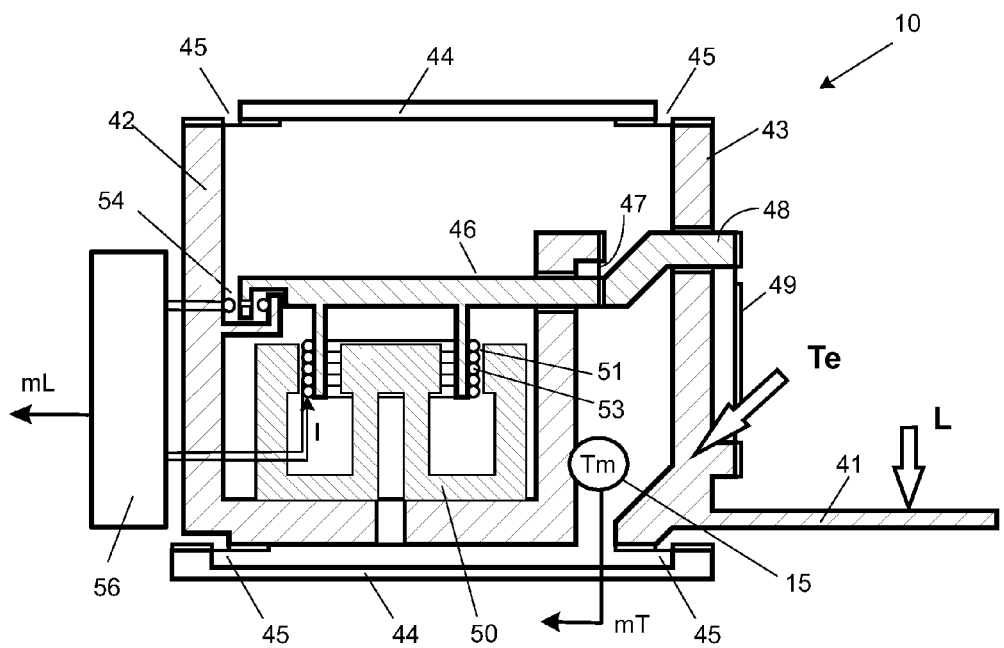
FIG. 2 illustrates a force-measuring cell based on electromagnetic force compensation for a balance in accordance with an exemplary embodiment.

FIG. 2 illustrates a force-measuring cell based on electromagnetic force compensation for a balance in accordance with an exemplary embodiment. As shown in FIG. 2, the force-measuring cell 10 has several different system components or assembly parts, including a force-transmitting mechanism with a parallel-guiding device that has a stationary part 42 and a vertically movable part 43, the latter being tied to the stationary part by a pair of guide members 44 with flexure pivots 45. The vertically movable part 43 includes a cantilevered extension 41 that serves to receive an input load L that is to be measured, which is indicated schematically by an arrow. The normal component of the force generated by the load L is transmitted from the vertically movable part 43 by way of a coupling element 49 to the first lever arm 48 of the lever 46. The lever 46 is supported on a portion of the stationary part 42 by means of a fulcrum flexure 47. The force-measuring cell 10 further includes a cup-shaped permanent magnet 50 which is arranged in fixed connection with the stationary part 42. The permanent magnet 50 has an air gap 51, and a coil 53 which is connected to the second lever arm of the lever 46 is immersed in the air gap. A compensation current Ic, whose magnitude depends on the force acting on the lever 46, is flowing through the coil 53. The position of the lever 46 is measured by means of an electro-optical position sensor 54 which is connected to a closed-loop control device 56. The control device (e.g., closed loop control device) 56 regulates the compensation current Ic dependent on the incoming position measurement signals such that the lever 46 is constantly held in the same position or is returned to the same position after a change of the load L. The closed-loop control device 56 produces a digital or analog force-measurement signal mL which is transmitted to a further signal-processing stage.

Dependent on the variable input force, a correspondingly variable compensation current Ic should be sent through the coil 53. As a result, a load-dependent power dissipation takes place in the coil 53. The coil 53 therefore acts as a load-dependent heat source and thus causes a corresponding temperature change in the components within its reach. This temperature change affects in particular the coil 53 itself, but also extends to the components being warmed up through heat transfer, for example the permanent magnet 50, the lever 46 and the position sensor 54.

A temperature sensor 15 is arranged on the stationary part 42 of the force-measuring cell 10. Accordingly, the temperature Tm that is measured by this temperature sensor 15 corresponds to a system temperature of the stationary part 42. As the stationary part 42 is in direct thermal contact to the ambient temperature Te acting on the force-measuring device, the temperature Tm being measured corresponds directly to the ambient temperature Te to which the balance 1 is exposed.

The temperature sensor 15 is arranged at some distance from the heat-generating coil 53. The temperature of the coil 53 therefore has only a minor influence on the temperature Tm that is being measured. Consequently, the temperature sensor 15 measures primarily the effect that the ambient temperature Te has on the balance 1.

The temperature sensor 15 is arranged so that the measured temperature Tm is largely independent of a temperature of any heat-generating component of the balance 1. The temperature sensor 15 could also be arranged, for example, on a wall of the housing enclosure of the balance 1.

The temperature sensor 15 generates a digital or analog temperature measurement signal mT which corresponds to the system temperature Ts of the stationary part 42 and thus primarily to the temperature Te of the ambient environment. This temperature measurement signal mT is then likewise transmitted, analogous to the force measurement signal, to a further signal-processing stage.

Figure 3:
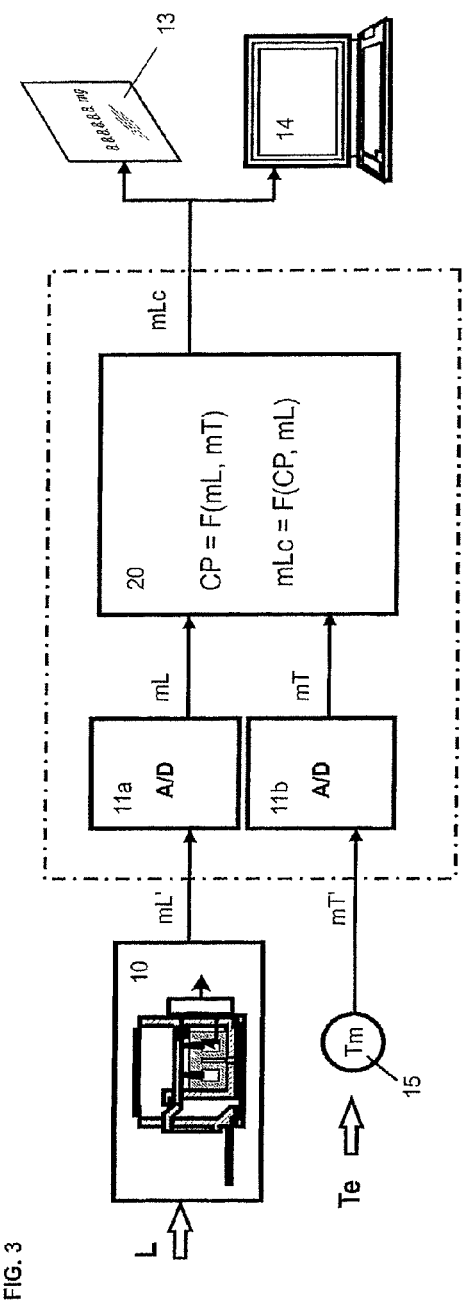
FIG. 3 illustrates a schematic diagram of a balance with a first signal-processing unit in accordance with an exemplary embodiment.

FIG. 3 illustrates a schematic diagram of a balance with a first signal-processing unit in accordance with an exemplary embodiment. As shown in FIG. 3, the exemplary force-measuring cell 10 generates an analog force measurement signal mL', which corresponds to the input load L acting on the force-measuring cell 10. A connection from the force-measuring cell 10 to an analog/digital converter 11a serves to transmit the analog measurement signal to the analog/digital converter 11a. The analog/digital converter 11a converts the incoming force measurement signal mL' into a digital force measurement signal mL, wherein this digital force measurement signal mL corresponds likewise to the input load L acting on the force-measuring cell 10 (analog signals in FIG. 3 are identified by a single apostrophe, while the corresponding digital signals are identified by the same symbols without apostrophe). A connection from the output of the analog/digital converter 11a to a first input of a signal-processing unit 20 serves to transmit the force-measurement signal mL to the latter.

The balance further includes the temperature sensor 15 described above, which serves to receive the temperature Tm that is to be measured. This temperature sensor 15 is connected to the second input of the signal-processing unit 20 by way of a further analog/digital converter 11b in order to deliver the temperature measurement signal mT' generated by the temperature sensor 15, after it has been converted into digital form, to the signal-processing unit 20 as a further input quantity.

In an exemplary embodiment, separate analog/digital converters 11a and 11b are used for the force measurement signal mL and for the temperature measurement signal mT, because of the different resolution and specified speed, respectively, in these conversions. However, the analog/digital converters 11a and 11b can also be combined in one unit. Furthermore, the analog/digital converters 11a and 11b can also be incorporated in the force-measuring cell 10 or in the temperature sensor 15 or in the signal-processing unit 20.

In the processing unit 20, the incoming force measurement signal mL is processed in accordance with the temperature measurement signal mT into a temperature-corrected output signal mLc. The temperature-corrected output signal mLc corresponds approximately to the incoming force measurement signal mL and thus also to the input load L. The output of the signal-processing unit 20 is connected to an indicator unit 13, so that the corrected output signal mLc can be transmitted to the indicator unit 13 and displayed by the latter. However, the corrected output signal mLc can also be transmitted to a further processing unit 14, for example to a monitoring-/alarm device, or to a master computer or a process controller.

Based on the force measurement signal mL and the temperature measurement signal mT, the signal-processing unit 20 calculates a correction parameter CP. As will be described in the following paragraphs, this correction parameter CP represents a temperature difference which exists between a system temperature and the measured temperature Tm and/or between a first system temperature and a second system temperature. The correction parameter CP is used in a further step to process the force measurement signal mL into a temperature-corrected output signal mLc. The arithmetic operations performed in the signal-processing unit 20 can be expressed in a general form through the following equations:

$$CP = F(mL, mT)$$

$$mLc = F(CP, mL, mT)$$

The analog/digital converters 11a and 11b and the digital processing unit 20, can be implemented in one functional unit and appropriately combined (as indicated by the dash-dotted rectangle), for example as component groups on a shared circuit board, in a shared housing, or in a microprocessor.

Figure 4:
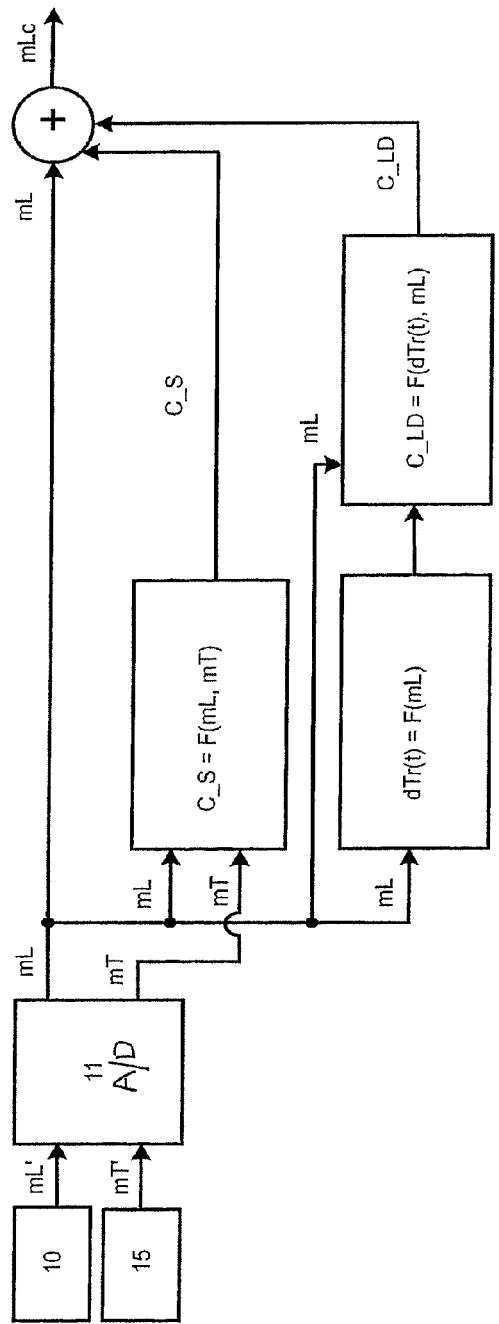
FIG. 4 illustrates a schematic diagram of a balance with a second signal processing unit in accordance with an exemplary embodiment.

FIG. 4 illustrates a schematic diagram of a balance with a second signal processing unit in accordance with an exemplary embodiment. As shown in FIG. 4, wherein the correction consists of a combination of a first temperature correction represented by a first correction summand C_S and a correction in accordance with the invention represented by a second correction summand C_LD which is calculated by means of the correction parameter CP described above in accordance with FIG. 3. In this case, the correction parameter CP represents a relative time-dependent temperature difference dTr(t) which is obtained as the difference between the system temperature of the coil 53 and the measured temperature Tm.

The original signals, for example the measurement signal mL' of the compensation current Ic and the temperature measurement signal mT' of the measured temperature Tm are delivered to the analog/digital converter 11 where they are converted into digital form. The corresponding output signals, for example the force measurement signal mL and the temperature measurement signal mT are now available in digital form for the subsequent arithmetic operations.

Following is a brief outline of the procedure of determining the correction summand C_S:

The magnetic field in the permanent magnet has a relatively strong temperature dependence with a temperature coefficient of −350 ppm/K for samarium-cobalt magnets. Thus, the strength of the current flowing in the coil 53 which is immersed in the magnetic field likewise has a relative strong temperature dependence. The force measurement signal mL corresponds again to the strength of the current in the coil 53. Therefore, in a known first correction, the force measurement signal mL is compensated for the temperature dependence of the permanent magnet 50 in regard to the measured ambient temperature Te. Accordingly, this correction is also referred to as static temperature correction or as first-order temperature correction which represents a so-called base correction for the load drift. In this step, the first correction summand C_S is calculated from the force measurement signal mL and the temperature measurement signal mT in accordance with the following equation:

$$C\_S = mL \times TK \times mT,$$

wherein TK represents a constant which can be determined empirically or is available from data sheets, for example the temperature coefficient TK. The first correction summand C_S as calculated in this example is in simple linear proportion to the force measurement signal mL and the temperature measurement signal mT. However, the calculation of the first correction summand C_S could also include higher-order terms, for example the squared value $(mL)^2$ of the force measurement signal.

After the first correction summand C_S has been calculated, it is entered into a summation operator which adds the first correction summand C_S to the original force measurement signal mL, whereby the latter is being corrected. Accordingly, the force measurement signal mL can be corrected through a first temperature correction in regard to changes of the input load L and in regard to changes of the measured temperature Tm. Analogous to FIG. 3, the corrected measurement signal is at the end transmitted to an indicator unit 13 and/or to a further processing unit 14.

In addition to the first correction summand C_S, and in accordance with the invention, a correction parameter CP as shown in FIG. 3 is calculated in accordance with the detailed description given in the following paragraphs. Based on this correction parameter CP, an additional, second correction summand C_LD is calculated in a subsequent operation. Based on this second correction summand C_LD, an additional correction is now applied to the force measurement signal mL. Accordingly, the correction according to the invention provides an additional, improved temperature correction, namely a load drift correction.

In an exemplary embodiment, the correction parameter CP representing a relative, time-dependent temperature difference dTr(t) represents the same characteristic time profile as a temperature difference which could in principle be measured, wherein CP differs from the latter temperature difference only in the respective normalizing constants.

In a first part of the calculations, a time-dependent rate of energy dissipation P(t) representing the time profile of the power dissipation in the coil 53 is determined from the force measurement signal. With the force measurement signal mL being in this case proportional to the coil current Ic, the dissipated power P(t) is obtained accordingly as:

$$P(t) = c \times mL^2,$$

wherein c is a proportionality constant. In other cases, where there is no proportionality, the power dissipation can likewise be calculated from the force measurement signal mL through simple computations.

In addition, a time-dependent response function S(t) is used in the calculation of the relative temperature difference dTr(t). The response function S(t) is based on a systematic thermodynamic property which represents the time-dependent behavior of a temperature difference of the balance 1. The response function S(t) is therefore derived from a thermodynamic quantity, namely the heat flow and/or heat conduction within the balance 1.

The time-dependent relative temperature difference dTr(t) is determined through a mathematical process of convoluting the rate of energy dissipation P(t) with the time derivative of the response function S(t), for example $$dTr(t) = P(t) \cdot S(0) + \int_0^t P(t') \cdot \frac{\delta S(t-t')}{\delta(t-t')} dt'.$$

For the determination of the response function S(t), a simple and exemplary thermodynamic model is described. In the thermodynamic model, the response function S(t) is obtained as the so-called step response to a step-shaped change of the force measurement signal mL. The step-shaped change in this case represents an input quantity to the balance 1, whose behavior in response to the input is described by a corresponding response function which follows a thermodynamic model, in this case the heat conduction occurring in the components of the force-measuring device. According to this model, the time-dependent response function S(t) can be described through the following expression:

$$S(t) = 1 \cdot e^{-t/\tau}$$

with a characteristic time constant $\tau$. The relative temperature difference dTr(t) can be calculated according to the equation given above, with the result:

$$dTr(t) = \frac{1}{\tau} \int_0^t P(mL(t')) \cdot e^{-\frac{t-t'}{\tau}} dt'.$$

One could also use other response functions S(t) or step responses for the mathematical modeling, in particular step responses representing a combination of several exponential functions.

A variety of methods are available for the calculation of the convolution integral of the time-dependent relative temperature difference dTr(t). For example, in the case of a constant detection rate with the sampling time interval $t_s$, the convolution integral can be approximated by a sum:

$$dTr(t=nt_s) = (t_s/\tau \cdot \Sigma_P(n))$$

wherein the sum $\Sigma_P(n)$ is defined by the recursion formula $$\Sigma_P(n) = c\Sigma_P(n-1) + 0.5(cP(n-1) + P(n)),$$

wherein $$c = e^{-t_s/\tau} < 1.$$

There are a variety of ways to perform these mathematical operations, for example in a computer program or with a recursive circuit design which contains delay units and/or summation operators and/or multiplication operators. With these approaches, the convolution integral can be calculated efficiently and with high precision through simple mathematical operations.

Accordingly, this calculation phase delivers as a result the correction parameter CP in the form of a relative temperature difference dTr(t). As with known methods, this temperature difference dTr(t) would be determined through physical measurements with a temperature sensor.

In a further part of the calculations, the second correction summand C_LD is calculated from the relative temperature difference dTr(t) according to the following equation:

$$C\_LD = mL \times TKLD \times dTr(t),$$

wherein the factor TKLD represents a given temperature coefficient of constant magnitude. This equation illustrates a very simple case. By taking higher-order terms into account, the accuracy of the calculation can be improved in accordance with specifications.

As in the case of the first correction, the second correction summand C_LD is passed on to the summation operator which, by additionally entering the second correction summand C_LD into the addition, performs a corresponding second correction. The force measurement signal mL is thus corrected in regard to the relative temperature difference dTr(t) and the load drift associated with it, which occurs as a result of the process of generating the compensation force. The load-drift-corrected output mLc is now available at the output of the signal-processing unit 20.

FIGS. 5a, 5b and 5c illustrate the correction of a further temperature-related phenomenon included in the calculation of the correction parameter CP according to exemplary embodiments disclosed herein, which represents the time-dependent transient temperature behavior of the balance of FIGS. 1 and 2, specifically the dynamic temperature behavior of the balance 1 with two lever arms 48a, 48b in the presence of an increase or decrease of the ambient temperature Te in the form of a so-called step change dTe. The correction parameter CP represents in this case a group of two temperature differences dT1 and dT2 occurring, respectively, in the two lever arms 48a, 48b and representing the respective differences between temperature Ts1, of the first lever arm 48a; and the temperature Ts2 of the second lever arm 48b and the measured temperature Tm. As will be described in the following paragraphs, the correction parameter CP can also represent a differential signal ΔdT representing a difference between the two temperature differences dT1 and dT2.

The ambient temperature Te acts on a lever 46 of the force-measuring device 1 and thus on the two lever arms 48a and 48b. As a result, a first temperature difference dT1 develops between the first temperature Ts1 of the first lever arm 48a and the measured temperature Tm, as well as a second temperature difference dT2 between the second temperature Ts2 of the second lever arm 48b and the measured temperature Tm.

FIG. 5a illustrates a schematic diagram of a balance with a third signal-processing unit in accordance with an exemplary embodiment. The correction parameter CP includes two temperature differences dT1 and dT2, each of which is calculated based on the temperature measurement signal mT described in FIGS. 3 and 4. In exemplary embodiment of FIG. 5a, the calculated temperature differences do not necessarily represent quantities that exist in reality. Rather, as in the preceding examples, they should be considered as abstract mathematical quantities. The temperature differences dT1 and dT2 are calculated according to the following sequence of steps.

FIG. 5b is a schematic diagram of a force-measuring device in accordance with an exemplary embodiment. As shown in FIG. 5b, a lever 46 serves as the transmission of the input load L to the coil 53. This lever is pivotally supported at the center of rotation X, which is a lever fulcrum. The lever 46 has a first lever arm 48a and a second lever arm 48b represented, respectively, by the masses $m_1$ and $m_2$.

The center of gravity of the first lever arm 48a with the mass $m_1$ has the distance $a_1$ from the fulcrum X of the lever. This mass represents the mass of the vertically movable part 43 of the balance. The second lever arm 48b with the mass $m_2$ represents the force-transmitting mechanism of the balance 1 which is assumed to be concentrated in a center of gravity at the distance $a_2$. Without including the input load L, the state of equilibrium is therefore expressed by the equation $$m_1 a_1 = m_2 a_2$$

If a load is present, the left lever arm carries, in addition to $m_1$, the load L, which is compensated by the magnetic force $f_M$ acting at the end of the right lever arm. Assuming that the ratio of the fulcrum distance $a_2$ of the center of gravity relative to the length $b_2$ of the right lever arm remains at a constant value β, this situation is described by the equations $$La_1 = f_M b_2 \text{ and } a_2 = \beta b_2,$$

wherein the lever ratio equals $b_2/a_1$.

With a jump dTe of the ambient temperature, in this case a step increase, the two masses $m_1$ and $m_2$ will warm up. The mass $m_1$ is relatively heavy and compact and the ratio between surface and mass is therefore relatively small. As a result, the first temperature Ts1 of the mass $m_1$ adjusts itself only slowly to the temperature jump dTe. In contrast, the mass $m_2$ is light and has a relatively large surface. Its temperature, for example the second temperature Ts2, is therefore relatively fast in following the temperature jump dTe. This has the consequence that the respective system temperatures Ts1 and Ts2 of the two lever arms 48a and 48b will differ from each other for a certain length of time. Accordingly, their temperature differences relative to the ambient temperature Te will likewise be different, namely dT1 for the first lever arm 48a and dT2 for the second lever arm 48b.

With the coefficient of expansion α, the two arms of the lever 46 will therefore exhibit different changes in length, for example $$\alpha \times dT1 \text{ for the first lever arm } 48a, \text{ and}$$

$$\alpha \times dT2 \text{ for the second lever arm } 48b.$$

Consequently, after the temperature jump dTe, there will be a shift in the mechanical equilibrium, as expressed by the equation:

$$(m_1+L)a_1(1+\alpha dT1) = m_2 a_2(1+\alpha dT2) + f_M b_2(1+\alpha dT2)$$

As in the preceding example of FIG. 4, the temperature differences dT1 and dT2 are determined, respectively, with a convolution integral and the time-dependent response functions S1(t), S2(t) and the characteristic time constants τ1 and τ2.

Accordingly, one can obtain the temperature differences $$dT_i(t) = mT_i(t) \cdot S_i(0) + \int_0^t mT_i(t') \frac{\delta S_i(t-t')}{\delta(t-t')} dt'$$

wherein i=1, 2. Thus, the calculations of the temperature differences dT1 and dT2 differ from each other only in the respective time constants τ1 and τ2.

In the case of a simple thermodynamic model, the response function S(t) can be expressed, analogous to the example of FIG. 4, as a step response with the characteristic time constants τ1 and τ2:

$$S(t) = 1 - e^{-t/\tau_i},$$

which leads to the convolution integral $$dT_i(t) = \frac{1}{\tau_i} \int_0^t mT(t') e^{-\frac{t-t'}{\tau_i}} dt'$$

with l=1, 2.

With a constant sampling rate, as in the calculation of the convolution integral in the preceding example of FIG. 4 which illustrates a load drift compensation, the convolution integrals can again be calculated very efficiently by approximating the integral through a summation and using a recursive approach.

As a result, the correction parameter in the form of the two temperature differences dT1 and dT2 is at this point available for the computation of a further, third correction summand C_DT.

The two temperature differences dT1 and dT2 can also be combined into a single difference signal ΔdT in accordance with the following expression:

$$\Delta dT = dT2 - dT1 = (Ts2 - Te) - (Ts1 - Te) = Ts2 - Ts1.$$

Accordingly, the difference signal ΔdT represents the difference between the two system temperatures, for example the difference between the second system temperature Ts2 and the first system temperature Ts1. Consequently, the correction parameter CP, by way of the difference signal ΔdT, describes the difference between the two temperature differences dT1 and dT2. Finally, the correction parameter CP in the form of the difference signal ΔdT is sent on (as indicated by a dashed arrow in FIG. 5a) to the next arithmetic module.

FIG. 5c is a graph of temperature profiles in accordance with an exemplary embodiment. In particular, FIG. 5c shows temperature profiles of the temperature differences dT1 and dT2 after the balance has been exposed to a sudden jump dTe of the ambient temperature Te. The temperature measurement signal mT, which closely corresponds to the temperature jump dTe, is indicated schematically by a step-shaped solid line. While the temperature difference dT2 (dotted line) is able to follow the temperature jump dTe more rapidly, the temperature difference dT1 (broken line) is slower to follow. The difference signal ΔdT (dash-dotted line), for example the difference (dT2−dT1) between the two temperature differences reflects the observed behavior of the balance, for example a strong initial temperature effect which gradually vanishes again within a certain time.

Under a constant load L, a time-dependent change of the compensation force $f_M$ can be calculated according to:

$$fm(t) - fm(0) = a_1 \alpha \frac{(dT1 - dT2)(L+m1)}{b_2(1+\alpha dT2)} \approx \frac{a_1}{b_2} \alpha \Delta T(L+m_1).$$

The third correction summand C_DT is therefore calculated according to the following equation:

$$C\_DT = c \times (dT1 - dT2) \times (mL+m0) = c \times \Delta dT \times (mL+m0),$$

wherein c and m0 are constants that have to be determined in an appropriate way, for example through an adjustment procedure.

Finally, as in the case of the first correction or the second correction, the third correction summand C_DT is entered into the summation operator which, by additionally entering the third correction summand C_DT into the addition, performs a corresponding correction. The force measurement signal mL is thus adjusted with an additional correction in regard to dynamic changes of the ambient temperature Te. The output signal mLc which is corrected in regard to temperature differences is again available for further processing.

Figure 6:
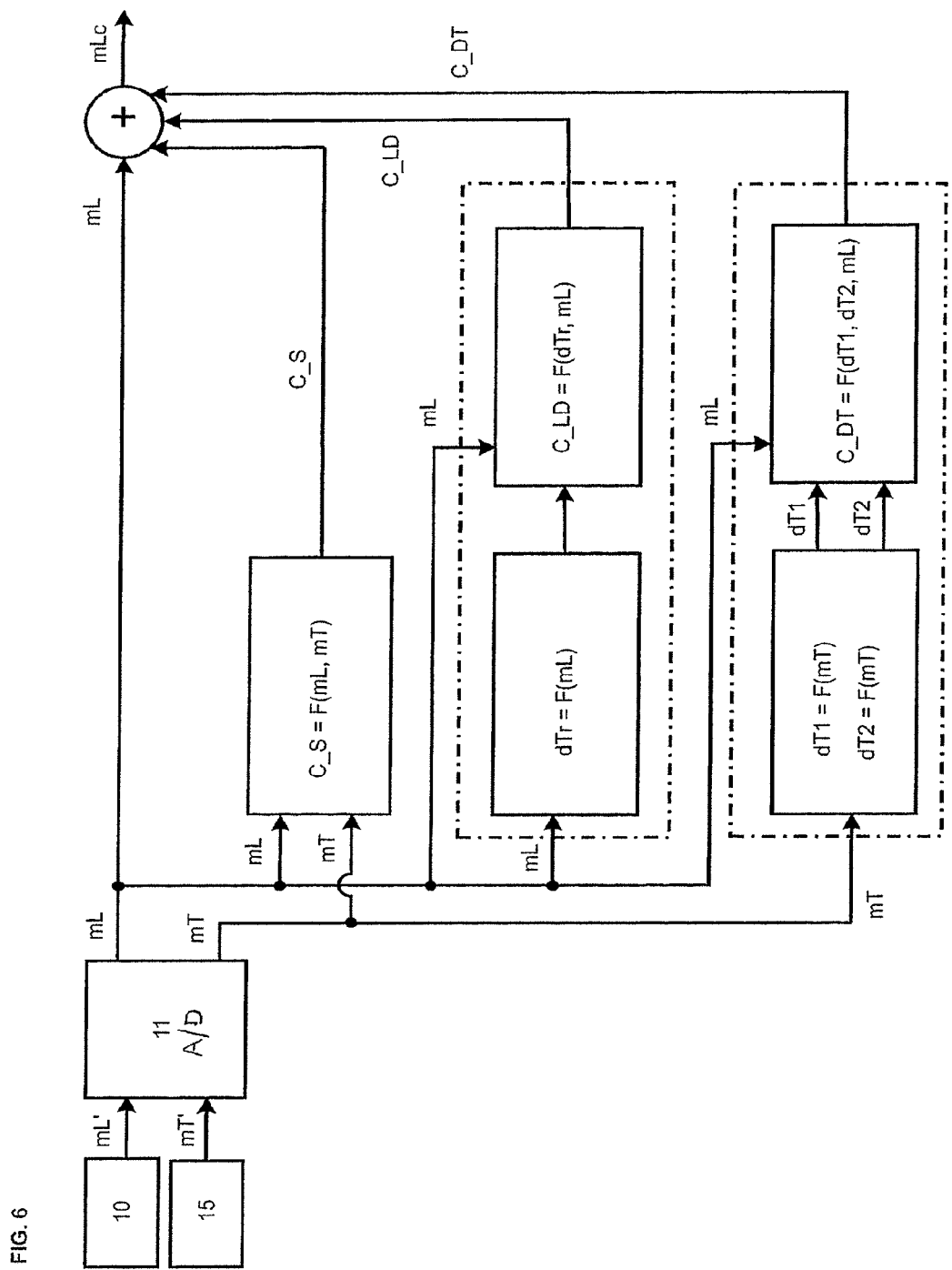
FIG. 6 illustrates a schematic diagram of an arrangement of arithmetic modules in accordance with an exemplary embodiment.

FIG. 6 illustrates a schematic diagram of an arrangement of arithmetic modules in accordance with an exemplary embodiment. In particular, FIG. 6 shows the calculation of the load drift correction and the calculation of the dynamic temperature behavior, are set up as individual, essentially separate arithmetic modules from which the overall calculation process is assembled. These modules are largely independent and can be incorporated in the overall calculation process as needed. It is also possible to connect any number of additional modules.

All of the correction summands, in this case the first correction summand C_S, the second correction summand C_LD for the load drift correction, and the third correction summand C_DT for the correction of the dynamic temperature behavior, are entered into the summation operator. With the addition of the three correction summands, for example C_S+C_LD+C_DT, the force measurement signal mL is corrected in regard to the influence factors described previously herein. The corrected output signal mLc is sent on for further processing, for example to an indicator for display, or to a further processing unit.

It is also possible to calculate any desired combination of the different measurement signals and temperature effects. For example, a short-term temperature rise of a component can lead to different system temperatures in other components. For instance, a sudden increase of the magnet temperature which can occur, e.g., when a load is placed on the load receiver can be used for the calculation of the respective temperature changes dT1 and dT2 and the associated changes in length of the lever arms 48a and 48b. Accordingly, the time-dependent temperature behavior can be calculated based on a change of the ambient temperature Te, and also based on the power dissipation P(t) of the coil which is a direct function of the load measurement signal mL.

An exemplary temperature-correction method according to the present disclosure and an exemplary force-measuring device 1 have been described and illustrated in accordance with exemplary embodiments. The force-measuring has been described as a balance 1. However, these embodiments can also be applied to other force-measuring devices such as thermogravimetric measuring instruments, weighing modules, load cells and measurement sensors which may in some cases be part of a balance. And also, the devices encompassed by the exemplary embodiments disclosed herein are of course not limited to a specific selection, configuration, grouping and application of the components.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for the temperature correction of a force-measuring device operating in measurement mode, comprising:
generating, by means of a force-measuring cell, an electrical force measurement signal corresponding to the input force;
measuring a temperature by means of a temperature sensor that is arranged at a distance from the heat-generating components of the force-measuring device, wherein said temperature corresponds primarily to an ambient temperature to which the force-measuring device is exposed, and generating a temperature measurement signal corresponding to the measured temperature;
processing the force measurement signal and the temperature measurement signal to obtain a temperature-corrected output signal; and
transmitting the output signal to an indicator unit and/or to a further processing unit,
wherein processing the force measurement signal and the temperature measurement signal includes calculating at least one correction parameter serving for the correction of the output signal from the force measurement signal and the temperature measurement signal based on a thermodynamic model wherein said correction parameter represents a temperature difference which exists between at least one of
a) a system temperature and the measured temperature, and
b) a first system temperature and a second system temperature.

2. The method according to claim 1, wherein the correction parameter is calculated through a recursive process.

3. The method according to claim 1, wherein the correction parameter is calculated as a time-dependent quantity which depends on the time profile of at least one of the measured temperature and the force measurement signal.

4. The method according to claim 1, wherein the correction parameter is calculated by means of a difference signal ($\Delta dT$), which is obtained as the difference between two temperature differences (dT1, dT2).

5. The method according to claim 1, wherein at least two corrections of the force measurement signal are calculated through two separate arithmetic modules, wherein each module performs, the calculation of at least one correction parameter.

6. The method according to claim 1, wherein the system temperature corresponds to a temperature of a component of the force-measuring device, and that the output signal is corrected with regard to the thermal expansion of said component.

7. The method according to claim 6, wherein the temperature of a component of the force-measuring device is a temperature of a force input element, a force-transmitting element, a lever, or a lever arm.

8. The method according to claim 1, wherein the correction parameter defines at least two of the temperature differences that are associated, respectively, with different components of the force-measuring device.

9. The method of claim 8, wherein the different components of the force-measuring device include two opposite lever arms.

10. The method according to claim 1, wherein the correction parameter is calculated by means of a response function and a convolution integral, by convoluting the temperature measurement signal, the force measurement signal, or an amount of dissipated power determined from the force measurement signal, with the time derivative of the response function.

11. The method according to claim 10, wherein the response function is defined in accordance with at least one of a thermodynamic response to an input in the form of a step function or impulse function, a time decay function with a given time constant, and at least one rule of thermodynamics.

12. The method of claim 11, wherein the time decay function is an exponential function with a given time constant.

13. The method according to claim 1, wherein the force-measuring device is based on electromagnetic force compensation, and that the correction parameter defines a temperature difference which occurs in connection with the process of generating the compensation force.

14. The method according to claim 13, wherein the compensation force is generated by means of a coil in which a current is flowing, whereby an amount of power is lost due to dissipation, and that the correction parameter is calculated as a function of the force measurement signal.

15. The method according to claim 13, wherein the compensation force is generated by the mutual interaction of a coil and a permanent magnet, and that the system temperature corresponds to a temperature of at least one of the coil and the permanent magnet.

16. The method of claim 13, wherein the correction parameter is calculated as a function of a power dissipation loss derived from the force measurement signal.

17. A force-measuring device comprising:
heat generating components;
a force-measuring cell generating an electrical force measurement signal corresponding to the applied force, and including:
a temperature sensor arranged at a distance from the heat-generating components, wherein said temperature sensor measures a temperature that corresponds to an ambient temperature acting on the force-measuring device and generates a temperature measurement signal corresponding to the measured temperature, wherein the measured temperature corresponds to an ambient temperature acting on the force-measuring device; and
a signal-processing unit that is configured to process the force measurement signal based on the temperature measurement signal and the force-measurement signal into a temperature-compensated output signal which can be transmitted to at least one of an indicator unit and a further processing unit, wherein the signal-processing unit is configured to calculate a correction parameter which is a correction of the output signal when the force-measuring device operates in measurement mode, wherein the correction parameter describes a temperature difference which exists between at least one of:
a) a system temperature and the measured temperature; and
b) a first system temperature and a second system temperature.

18. The force-measuring device according to claim 17, wherein the temperature sensor is in thermal contact with a stationary component of the force-measuring device.

19. The force-measuring device according to claim 17, wherein the signal-processing unit is configured to operate based on a thermodynamic model in calculating the correction parameter.

* * * * *